Aug. 15, 1933.  S. SHERIFF ET AL  1,922,784
ICE CREAM FREEZER
Filed Oct. 12, 1931  2 Sheets-Sheet 1

Samuel Sheriff
Henry J. Hitzfeld.
INVENTORS

BY Victor J. Evans & Co.
ATTORNEY

Aug. 15, 1933.   S. SHERIFF ET AL   1,922,784
ICE CREAM FREEZER
Filed Oct. 12, 1931    2 Sheets-Sheet 2

Samuel Sheriff
Henry J. Hitzfeldt
INVENTORS

BY Victor J. Evans & Co.
ATTORNEY

Patented Aug. 15, 1933

1,922,784

UNITED STATES PATENT OFFICE 1,922,784

ICE CREAM FREEZER

Samuel Sheriff and Henry J. Hitzfeldt, Wilkinsburg, Pa.

Application October 12, 1931. Serial No. 568,474

1 Claim. (Cl. 259—104)

This invention relates to an ice cream freezer, and it consists in the novel features hereinafter described and claimed.

An object of the invention is to provide a freezer which will effectually agitate, smoothly and thoroughly, the material during the operation of freezing.

A further object is to provide means for the introduction of the material during the process of freezing, and for the ejection of the frozen material without interrupting the operation of the machine.

Figure 1:
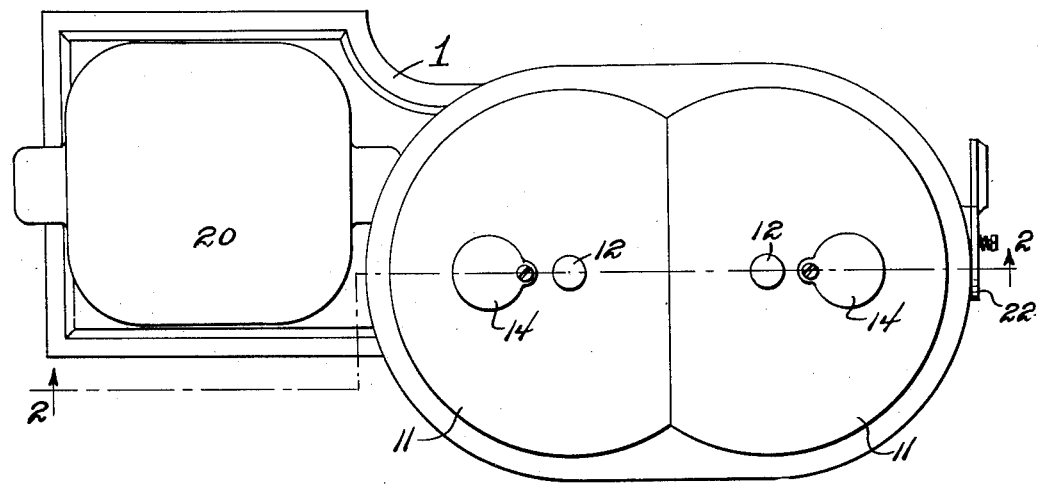
Figure 1 is a top plan view of the freezer.
Figure 2:
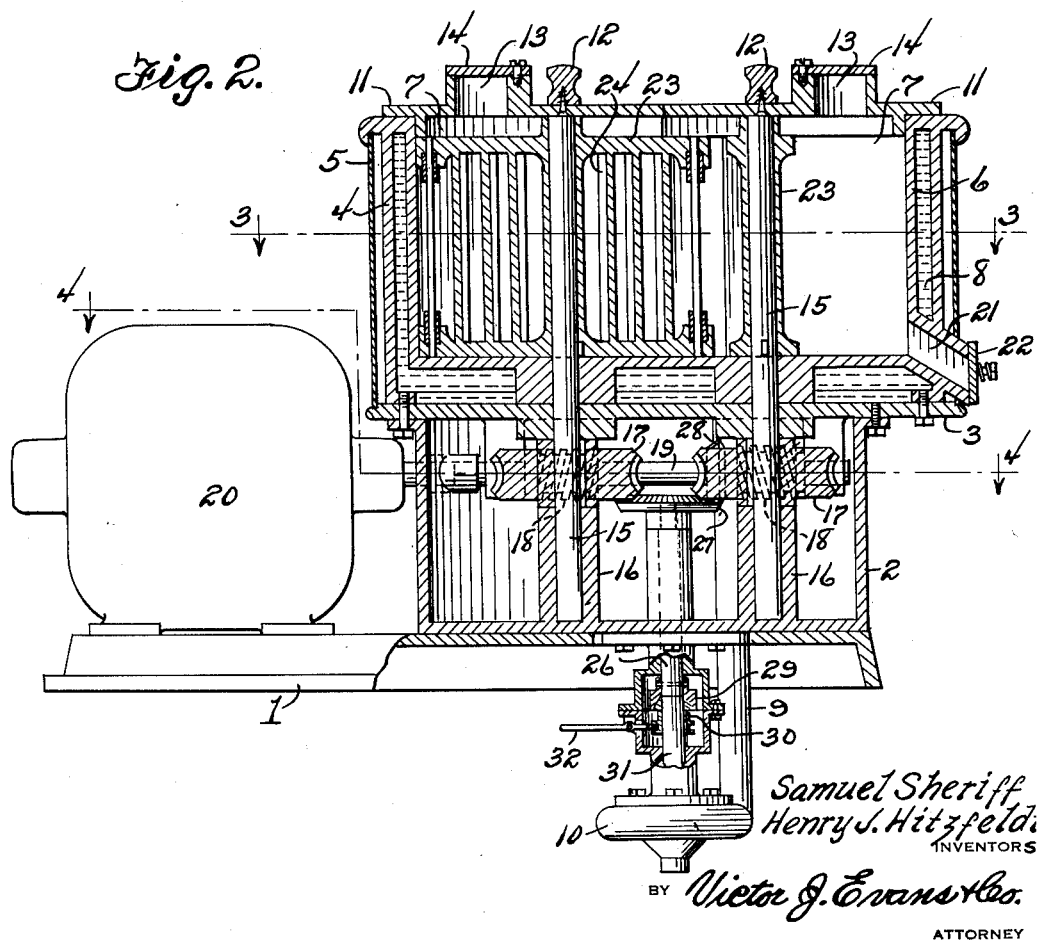
Figure 2 is a sectional view thereof cut on the line 2—2 of Figure 1.
Figure 3:
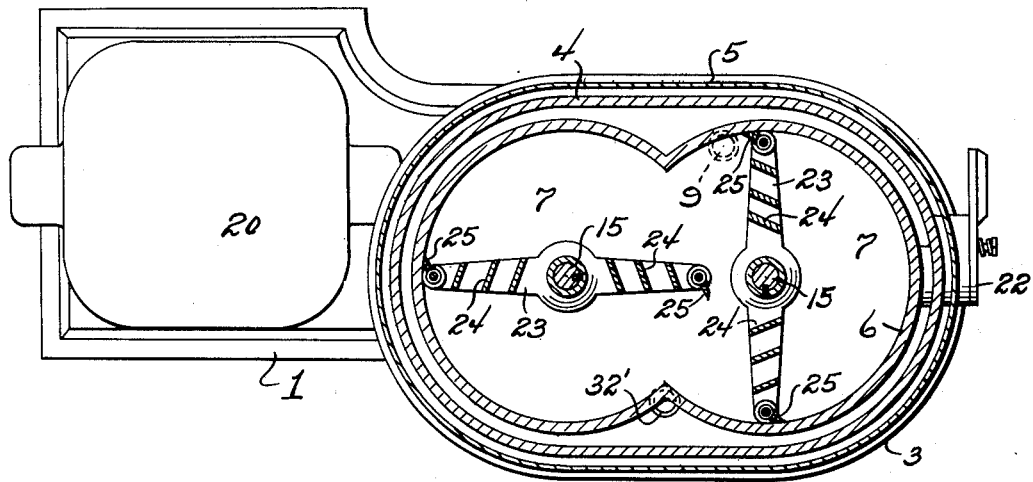
Figure 3 is a horizontal sectional view cut on the line 3—3 of Figure 2.
Figure 4:
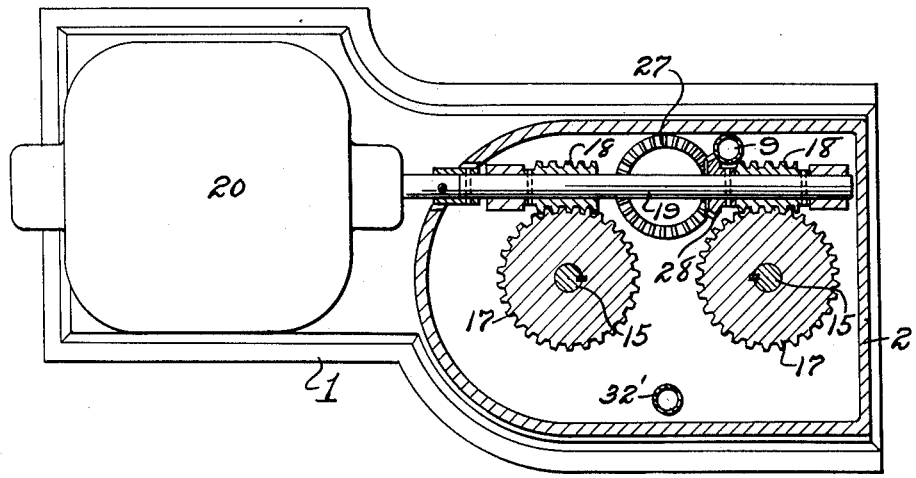
Figure 4 is a similar view cut on the line 4—4 of Figure 2.

The freezing apparatus includes a base 1 having a casing 2 mounted thereon. A plate 3 closes the upper end of the casing. An elliptical wall 4 is mounted upon the plate 3 and is surrounded by a shield 5 which is spaced from the said wall. A body portion 6 depends from the upper edge of the wall 4 and is spaced therefrom. The body portion 6 forms end chambers 7 which are arcuate in horizontal section. The space between the wall 4 and the body 6 is filled with a freezing agent 8 as, for instance, ammonia or suitable brine solution delivered into the said space through a pipe 9 from a pump 10 as will be hereinafter explained. The upper end of the body 6 is closed by a cover 11 having handles 12 mounted thereon and provided with inlet openings 13 normally closed by lids 14. The material to be frozen may be introduced into the body 6 and the chamber thereof through the openings 14. By using the handles 12, the cover may be readily removed from the body. Shafts 15 pass through the plate 3 and the bottom wall of the body 6 and are journalled in bearing sleeves 16 provided within the casing 2. Worm wheels 17 are fixed to the shaft 15 and meshed with worms 18 mounted upon a shaft 19 which in turn is operatively connected with a motor 20. The body 6 is provided with an outlet opening 21 which is normally closed by a lid 22. Through the outlet opening 21, the frozen material may be withdrawn from the body. Beater arms 23 are mounted upon the shafts 15 and paddles 24 are disposed between the upper and lower beater arms. Scrappers 25 are carried at the outer ends of the beater arms and have contact with the inner walls of the chambers 7. A shaft 26 is journaled in the bottom of the casing 2 and is provided at its upper end with a beveled gear wheel 27 which meshes with a beveled gear wheel 28 mounted upon the shaft 19. A clutch member 29 is attached to the lower end of the shaft 26 and is adapted to be engaged by a clutch member 30 slidably mounted upon a shaft 31 which operates the pump 10. The clutch member 30 may be moved upon the shaft 31 by using a lever 32. When the clutch members are in engagement with each other and the shaft 26 is rotating, rotary movement is transmitted to the pump 10 whereby the freezing agent is pumped through the pipe 9 into the space between the wall 4 and the body 6. The freezing agent may return to the pump through the said space through a pipe 32 best indicated in Figure 4 of the drawings from the freezing tank or unit. As the shaft 19 rotates, rotary movement is transmitted through the worms 18 and worm wheels 17 to the shafts 15 whereby the beaters 23 and the paddles thereon are carried around in the chambers 7 and the material is agitated while being frozen.

The beater elements are so made that the blades on one end of the beater arms follow in the track of the blades upon the opposite end. The blades are disposed at the same angle with relation to a vertical plane upon the axis of the shaft which supports the beater but the slant of the blades at one side of said plane is opposite to the slant of the blades at the opposite side of said plane, so that all of the blades do not throw the cream toward the center. The set of blades at one side of the plane throw the cream away from the center of the shaft and the blades at the opposite side of said plane throw the cream toward the center of the shaft. By reason of this arrangement, the blades have centrifugal and centripetal action upon the cream. This produces a smooth and even freezing effect and also serves to properly pass the cream from one set of blades to the blades in an adjacent chamber of the body of the freezer.

Having described the invention, what is claimed is:

A freezer comprising a body having twin chambers provided with cylindrical wall surfaces, shafts journaled for rotation at the centers of said chambers, beater arms carried by the shafts, beater blades carried by the arms, the blades at one side of the shafts being located at the same distance from the centers of the shafts as the blades at the opposite sides, the blades at the opposite sides of the centers of the shafts being disposed at opposite angles to the plane passing through the centers of both the shafts, means for rotating the shafts simultaneously, and scraper blades carried at the outer ends of the arms and adapted to engage the cylindrical surfaces of the chambers.

SAMUEL SHERIFF.
HENRY J. HITZFELDT.